Sept. 8, 1931.  H. HUTCHINSON  1,822,592
TIRE VALVE
Filed March 8, 1928
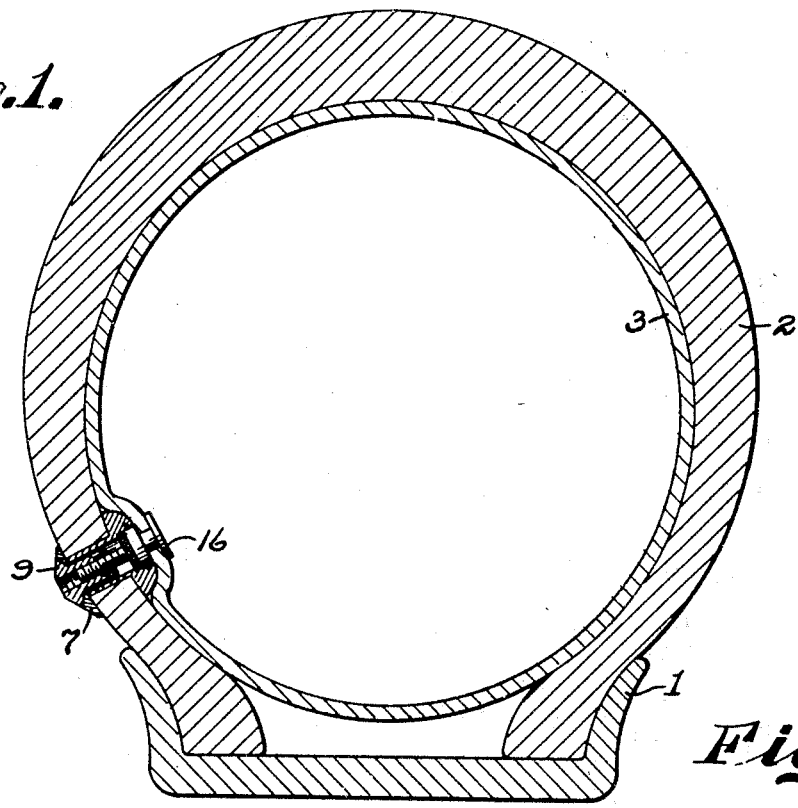
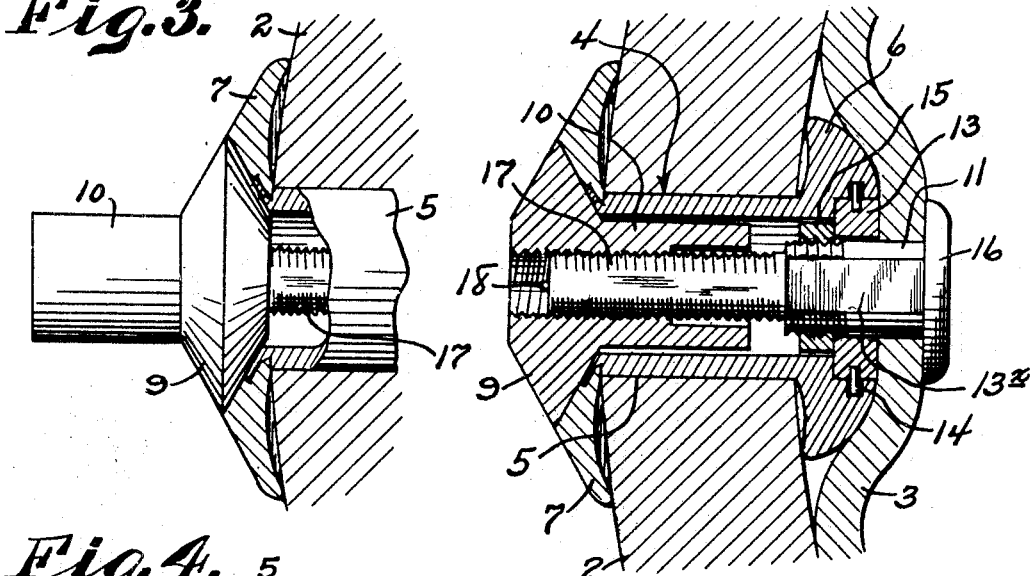
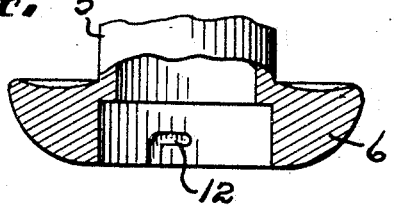
INVENTOR.
Harry Hutchinson
BY James F. Splain
ATTORNEY.

Patented Sept. 8, 1931

1,822,592

UNITED STATES PATENT OFFICE

HARRY HUTCHINSON, OF ABSECON, NEW JERSEY, ASSIGNOR OF ONE-FOURTH TO EDWARD W. GRISWELL AND ONE-FOURTH TO FRED ARDREY, BOTH OF ABSECON, NEW JERSEY

TIRE VALVE

Application filed March 8, 1928. Serial No. 260,027.

The object of my invention is the provision of a compact and neat tire valve adapted to permit of ready inflation of a tire, and one which obviates perforation of the rim and which is calculated to prevent water from gaining access to the interior of the tire casing.

To the attainment of the foregoing the invention consists in the improvement as hereinafter described and definitely claimed.

In the accompanying drawings, forming part of this specification:

Figure 1 shows a tire equipped with the preferred embodiment of my invention.

Figure 2 is an enlarged section of my novel valve.

Figure 3 shows the valve ready for the connection of an air supply pipe.

Figure 4 is a detail section showing one of the bayonet slots.

Similar numerals of reference designate corresponding parts in all of the views of the drawings.

The rim 1, casing 2 and inflatable tube 3 are all of the ordinary construction except that the rim 1 is imperforate.

At 4 the casing 2 is punctured to receive a tubular valve body 5 with a head 6 at its inner end interposed between the casing 2 and tube 3. Secured on the outer end of the body 5 is an annular member 7 which secures the body in the casing. In the outer side of said member 7 is a countersink to receive the head 9 of an interiorly threaded reversible tube 10, said tube 10 being normally arranged as shown in Figure 2, so that no material projection is offered on the casing, and being positioned as in Figure 3 when it is desired to secure an air hose on the tube 10.

For the holding of an exteriorly threaded valve tube 11 in the tubular body 5 I provide the means shown in Figures 2 and 4. The said means comprise bayonet slots 12 in the flange 6, Figures 2 and 4, a collar 13 with an interior flat portion for opposition to a flat outer side portion 13x of the tube 11, Figure 2, said collar 13 having pins 14 to cooperate with said bayonet slots, and an annular disk 15 threaded on the valve tube and arranged against the collar 13. Manifestly the opposition of the interior flat portion of the collar 13 to the flat side portion 13x of the valve tube 11 keys the collar 13 and tube 11 together. The valve tube 11 is headed at 16 to bear against the inner side of the inflatable tube 3, and is adequately held against endwise movement in and relative to the body 5 by the collar 13 and washer 15. The thread 17 of the valve tube 11 is for the engagement of the tubular member 10.

In the tube 11 is an outwardly seating nonreturn valve 18 which may be of the usual construction or of any other construction compatible with the purpose of my invention.

As will be gathered from Figure 1 my novel tire valve in its normal state does not render a tire in any way unsightly.

When it is desired to supply the tube 3 with air under pressure, the tubular member 10 is shifted from the position shown in Figure 2 to that shown in Figure 3, and after the necessary inflation of the tube 3 the air hose is removed from the member 10 and said member 10 is reversed—i. e., restored to the position shown in Figure 2.

I prefer the specific construction illustrated but do not limit myself to the same, my invention being defined by my appended claims within the scope of which modification may be made without departure from my invention.

Having described my invention, what I claim and desire to secure by Letters Patent, is:

1. A tire valve comprising a tubular body adapted to extend through a tire casing and having a flange adapted to be interposed between an inflatable tube and the casing, an annulus with a countersink, secured on the outer end of the tubular body, a threaded valve-containing tube in the tubular body, and an interiorly threaded reversible tubular member removably engaged with the valve-containing tube and having an end head to seat in either position of the tubular member in the countersink of the annulus.

2. A tire valve comprising a tubular body adapted to extend through a tire casing and having a flange adapted to be interposed between an inflatable tube and the casing, an annulus with a countersink, secured on the outer end of the tubular body, a threaded valve-containing tube in the tubular body, an interiorly threaded reversible tubular member removably engaged with the valve-containing tube and having an end head to seat in either position of the tubular member in the countersink of the annulus, and means securing the valve-containing tube in the tubular body and including bayonet slots in the flange of the tubular body and a unit keyed to the valve-containing tube and having pins disposed in said slots.

3. In combination, a tubular valve body adapted to be secured in a casing and having at its outer end an annular member with a countersink in the outer side thereof, a threaded valve containing tube adapted to be secured in said body and secured to an inner tube, and a reversible tubular interiorly threaded member removably arranged in said body and on and in engagement with said valve-containing tube and having at its outer end a head either side of which is adapted to be seated in said countersink.

In testimony whereof I affix my signature.

HARRY HUTCHINSON.